(12) United States Patent
Kärki et al.

(10) Patent No.: US 11,802,025 B2
(45) Date of Patent: Oct. 31, 2023

(54) REMOTE CONTROL WORKSTATION

(71) Applicant: Cargotec Finland Oy, Tampere (FI)

(72) Inventors: Ville-Pekka Kärki, Tampere (FI); Marko Lehto, Tampere (FI); Timo Lehto, Tampere (FI); Tapio Piipari, Tampere (FI); Antti Sutela, Tampere (FI); Tomi Tuulkari, Tampere (FI); Tomi Uusitalo, Tampere (FI)

(73) Assignee: Cargotec Finland Oy, Tampere (FI)

( * ) Notice: Subject to any disclaimer, the term of this patent is extended or adjusted under 35 U.S.C. 154(b) by 497 days.

(21) Appl. No.: 17/274,447

(22) PCT Filed: Sep. 13, 2019

(86) PCT No.: PCT/FI2019/050657
§ 371 (c)(1),
(2) Date: Mar. 9, 2021

(87) PCT Pub. No.: WO2020/058569
PCT Pub. Date: Mar. 26, 2020

(65) Prior Publication Data
US 2022/0048742 A1   Feb. 17, 2022

(30) Foreign Application Priority Data
Sep. 17, 2018   (FI) ...................................... 20185772

(51) Int. Cl.
*B66C 13/40*   (2006.01)
*G05D 1/00*    (2006.01)
(Continued)

(52) U.S. Cl.
CPC ........... *B66C 13/40* (2013.01); *G05D 1/0016* (2013.01); *G05D 1/0027* (2013.01); *G05G 9/047* (2013.01); *G06F 3/0482* (2013.01)

(58) Field of Classification Search
CPC ......... B66C 13/40; B66C 13/54; B66C 13/00; G05D 1/0016; G05D 1/0027;
(Continued)

(56) References Cited

U.S. PATENT DOCUMENTS 9,110,468 B2 * 8/2015 Funke ................. G05D 1/0011
2012/0081615 A1   4/2012 Starr et al.
(Continued)

FOREIGN PATENT DOCUMENTS

EP    3170783 A1    5/2017

OTHER PUBLICATIONS

Konecranes: Remote Operating Station (ROS). Retrieved from: https://web.archive.org/web/20170611032933/https://www.konecranes.com/equipment/container-handling-equipment/remote-container-handling/remote-operating-station-ros.
(Continued)

*Primary Examiner* — Richard M Camby
(74) *Attorney, Agent, or Firm* — Laine IP Oy

(57) ABSTRACT

According to an example aspect of the present invention, there is provided a remote control workstation for controlling more than one type of load handling equipment. The remote control workstation is configured for communications with a plurality of types of load handling equipment and configured to cause connecting to one of said load handling equipment, determining a type of the connected load handling equipment, and in response to establishing a connection between the remote control workstation and said load handling equipment, displaying on a user interface of the remote control workstation a load handling equipment type specific control view from a plurality of load handling equipment type specific control views in accordance with a load handling equipment type of said load handling equipment.

20 Claims, 7 Drawing Sheets

(51) Int. Cl.
*G05G 9/047* (2006.01)
*G06F 3/0482* (2013.01)

(58) Field of Classification Search
CPC ......... G05D 2201/0205; G05D 1/0011; G05D 1/0033; G05D 1/0044; G05G 9/047; G06F 3/0482; G06F 3/011; G06F 3/016; G06F 3/0481; G06F 3/0488; G06F 3/0202; G06F 3/048; H01H 2025/048; H01H 25/04
See application file for complete search history.

(56) References Cited

U.S. PATENT DOCUMENTS

| | | | | |
|---|---|---|---|---|
| 2014/0214240 | A1* | 7/2014 | Funke | G05D 1/0027 701/2 |
| 2014/0250397 | A1 | 9/2014 | Kannan et al. | |
| 2019/0155237 | A1* | 5/2019 | Kean | G05B 19/0423 |
| 2022/0412048 | A1* | 12/2022 | Sasaki | E02F 9/2054 |

OTHER PUBLICATIONS

Miadlicki et al: Overview of user interfaces used in load lifting devices. Int Journal of Scientific & Engineering Research, Sep. 2015, vol. 6, No. 9, pp. 1215-1220.

Siemens AG: Remote Control Operation System, Mar. 29, 2018. https://web.archive.org/web/20180329025714/http://w3.siemens.com/mcms/mc-solutions/en/mechanical-engineering/crane-solutions/remote-controlsystem/pages/remote-control-operation-system.aspx.

Ylitalo: Testing and developing a remote controlled and supervised container handling equipment. Sep. 6, 2017, Tampere University of Technology, Master of Science Thesis.

* cited by examiner

REMOTE CONTROL WORKSTATION

FIELD

The present invention relates to a remote control workstation for controlling load handling equipment.

BACKGROUND

Load handling equipment (LHE) can be controlled remotely by a workstation. A single remote control workstation is limited to control one type of LHE. However, in many load handling areas such as in harbours, there are more than one type of LHE used for load handling. A user operating one type of LHE at one remote control workstation is away from other remote control workstations for other types of LHE which may prevent the user attending operational tasks of those LHE. When operational tasks are left unattended, load handling efficiency in the load handling area may be reduced. Moreover, then unattended tasks may concern or be escalated to scenarios, where material damage to LHE and even safety of the personnel in the load handling area is under threat.

SUMMARY OF THE INVENTION

The invention is defined by the features of the independent claims. Some specific embodiments are defined in the dependent claims.

According to a first aspect, there is provided a remote control workstation for controlling more than one type of load handling equipment (LHE), wherein the remote control workstation is configured for communications with a plurality of types of load handling equipment, said remote control workstation being configured to cause:

connecting to one of said load handling equipment;
determining a type of the connected load handling equipment; and
in response to establishing a connection between the remote control workstation and said load handling equipment, displaying on a user interface of the remote control workstation a load handling equipment type specific control view from a plurality of load handling equipment type specific control views in accordance with a load handling equipment type of said load handling equipment.

According to a second aspect, there is provided a method for a remote control workstation for controlling more than one type of load handling equipment (LHE), wherein the remote control workstation is configured to communicate with a plurality of types of load handling equipment, the method comprising:

connecting to one of said load handling equipment;
determining a type of the connected load handling equipment; and
in response to establishing a connection between the remote control workstation and said load handling equipment, displaying on a user interface of the remote control workstation a load handling equipment type specific control view from a plurality of load handling equipment type specific control views in accordance with a load handling equipment type of said load handling equipment.

According to a third aspect, there is provided a computer program for use in a remote control workstation for controlling more than one type of load handling equipment (LHE), which when executed on a computer comprised in the remote control workstation, causes a method in accordance with at least some embodiments to be performed.

According to a fourth aspect, there is provided a non-transitory computer readable medium having stored thereon a set of computer readable instructions that, when executed by at least one processor, cause a remote control workstation to at least to perform a method according to an aspect.

According to a fifth aspect, there is provided a remote control workstation for controlling more than one type of load handling equipment (LHE), comprising: means for communicating with a plurality of types of load handling equipment; means for connecting to one of said load handling equipment; means for determining a type of the connected load handling equipment; and means for, in response to establishing a connection between the remote control workstation and said load handling equipment, displaying on a user interface of the remote control workstation a load handling equipment type specific control view from a plurality of load handling equipment type specific control views in accordance with a load handling equipment type of said load handling equipment.

The user interface may, in any of the aspects, be adapted for performing load handling operations based on the type of the load handling equipment on the basis of settings corresponding to different types of load handling equipment. One or more (physical) components of the user interface may thus be configured in accordance with the determined type of the load handling equipment, and data obtained from the connected load handling equipment may be used to populate the load handling equipment type specific control view selected from the plurality of load handling equipment type specific control views.

EMBODIMENTS

Figure 1:
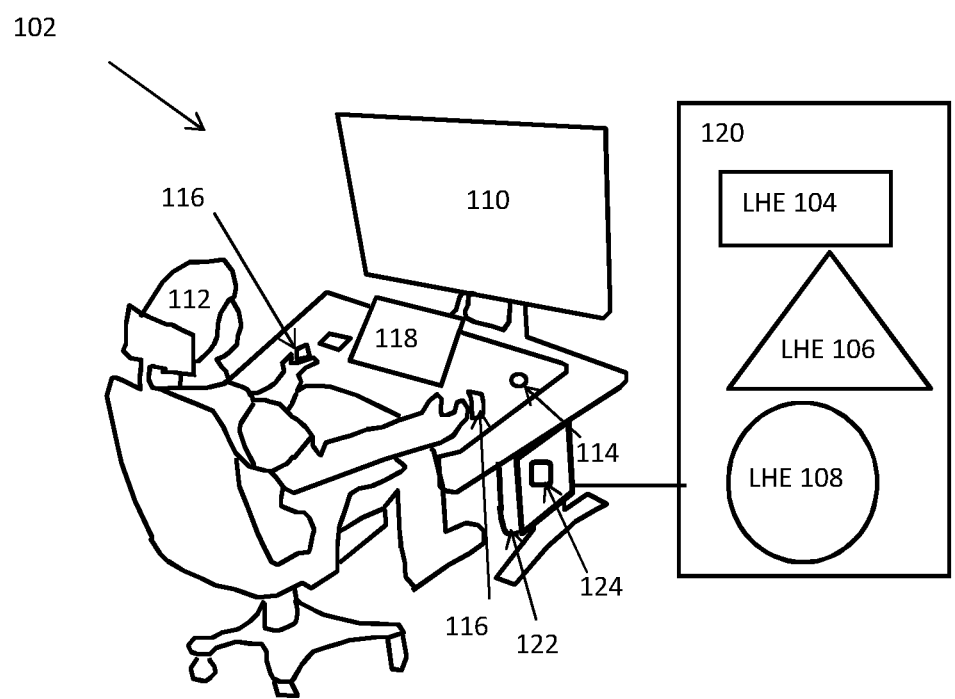
FIG. 1 illustrates a remote control workstation in accordance with at least some embodiments of the present invention.

In connection with remote controlling of load handling equipment (LHE) there is provided remote control workstation for controlling more than one type of LHE. The remote control workstation is configured for communications with a plurality of types of load handling equipment. The remote control workstation is connected to a load handling equipment and a type of the connected load handling equipment is determined. Then, a load handling equipment type specific control view in accordance with the type of the connected load handling equipment is displayed, in response to establishing a connection between the remote control workstation and said load handling equipment. The displayed load handling equipment type specific control view is one of plurality of load handling equipment type specific control views that may be displayed for remotely controlling different type of LHE. Since the load handling equipment type specific control view according to the type of the LHE is displayed, the remote control workstation is capable to be used for controlling at least part of the load handling operations of different types of LHE.

Examples of different types of LHE comprise at least LHE that are container handling equipment and capable of moving containers. The containers may be cargo containers or other transport containers. The containers may be intermodal containers capable of being carried by multiple modes of transportation, e.g. by rail, ship and truck. The LHE may be operated in cargo handling areas such as harbours, warehouses and railway yards. Examples of the LHE types may comprise automated Stacking Cranes (ASC), Automated Guided Vehicles (AGV), Straddle Carriers (SC), Rubber Tired Gantry Cranes (RTGs), Rail-Mounted Gantry Cranes (RMGs) which are capable of moving containers and may be used in various embodiments described herein.

It should be appreciated that different types of LHE may be configured for performing specific load handling operations and have one or more specific physical structures and/or functionalities configured for handling load in the specific load handling operations of a specific LHE type. For example, An AGV may be configured for horizontal transport of a single container at a time between quayside a container stack;

An ASC may be configured for moving containers between stacks and unloading and loading AGVs, thus both for horizontal and vertical movement of containers. The ASC may be an automated gantry crane that can straddle over two, three, four, five, or more stacks of containers and/or AGVs. The height of the stacks may be two, three, four, five and even a higher number of containers;

An SC may be configured for horizontal transport of containers and to stack containers in stacks of one, two, three or more containers. In contrast to the ASC, the SC can straddle over one container or container stack at a time.

Example physical structures of the LHE comprise a trolley, a spreader, flippers and lighting systems. A spreader may be attached to a crane for engaging a container at four peripheral points on the upper portion of the container. The engagement of the spreader and container may be achieved by what is termed a twist lock engagement which is arranged to provide a quick engagement and disengagement arrangement. The spreader may be attached to the LHE by one or more ropes. When the spreader is engaged to the container, the container may be hoisted by the LHE by hoisting machinery. The LHE may comprise a trolley, where the hoisting machinery is arranged. The trolley may be arranged movable on a bridge extending between legs of a crane, e.g. ASC, or on a bridge spanned between other structures e.g. walls of a warehouse. The trolley may provide horizontal movement of the containers attached to the spreader over the bridge. The flippers may be installed to corners of the spreader for assisting in moving the spreader to a position for engaging to the container and guide the spreader so as to align the twist lock engagement between the spreader and container. Lighting systems may comprise work area lighting and drive lighting. The work area lighting may comprise lighting equipment for illuminating the load and/or a load handling area. The drive lighting may comprise lighting equipment for illuminating an area around the LHE at least in a direction of movement of the. Accordingly, example physical configurations of different types of LHE comprise:

ASC may comprise a trolley, a spreader and flippers

AGV does not comprise a trolley, a spreader and flippers;

SC comprises a spreader but no trolley and flippers; and

LHE lighting systems for illuminating the load handling area. Due to the difference in load handling of the ASC, AGV and SC, their lighting systems also need to be controlled separately and specific to each device.

FIG. 1 illustrates a remote control workstation 102 in accordance with at least some embodiments of the present invention. The remote control workstation is configured for communications with a plurality of types of load handling equipment 104, 106, 108. The configuration provides that the different types of LHE may be operated by the remote control workstation.

The remote control workstation may comprise a user interface. The user interface may comprise one or more components configured to obtain input from the user and output information to the user as will become apparent from below. A user 112 may be positioned at the remote control workstation for using the user interface. The user may be positioned at the workstation in a seated position on a chair or in a standing position. The height of the workstation may be adjustable e.g. by an electric drive to different positions of the user at the remote control workstation.

In an example, an LHE type, a name and a connection setting of each LHE may be configured to the remote control workstation such that a specific LHE may be identified and connected by the remote control workstation for controlling the specific LHE.

In an example, components of the user interface may comprise one or more displays 110 for displaying information to the user. Examples of the information displayed to the user may comprise one or more of a control view, load handling equipment type specific control view, load handling equipment fleet management view, a menu, a joystick menu and a user interface element. It should be appreciated that displaying information to the user is only one example of outputting information by the remote control workstation to the user and also tactile output, vibrations and/or audible output are viable and the remote control workstation may be equipped with corresponding means for outputting information to the user. Examples of displays comprise display devices for computers and touch screens.

In an example, components of the user interface may be capable of obtaining input from the user 112 positioned at the remote control workstation. The user interface may comprise one or more of a button 114, a key, a keypad, a joystick 116, a microphone, a touch screen 118 and other means for obtaining input from the user. At least some of the information displayed by the user interface may be selectable by the user entering an input via the user interface.

It should be appreciated that a component of the user interface may comprise one or more capabilities for outputting information to the user and/or obtaining input from the user. For example one or more of the capabilities of outputting information and/or one or more of the capabilities of obtaining input from the user may be provided by a single device. For example, the touch screen 118 may be capable of both displaying information to the user and obtaining input from the user via touch and/or gestures. The touch screen may be provided for example on a tablet computer, whereby further capabilities may be provided via a speaker and a microphone of the tablet computer. In a further example, the joystick 116 may be capable of obtaining input from the user by the user moving the joystick and the joystick may be configured to vibrate to output information to the user regarding operating the LHE by the remote control workstation.

In an embodiment, the remote control workstation comprises a joystick 116 for controlling operations of load handling equipment. The joystick comprises one or more buttons for obtaining selections from the user. In response to one or more selections of the buttons by the user, the remote control workstation may be caused to display a menu on top of a load handling equipment type specific control view or on a separate device for displaying load handling equipment specific information, browsing the menu and selecting a menu item from the menu. In this way the menu and operations of the menu may be provided without the user releasing his/her grip from the joystick. In an example the load handling equipment type specific control view may be displayed on one display of the user interface and the menu may be displayed on another display of the user interface, thus on a separate device. In this way the menu and the load handling equipment type specific control view may be displayed at the same time without affecting the functionality of the load handling equipment type specific control view.

In an embodiment, the remote control workstation may comprise a configuration profile 124 comprising settings corresponding to different types of LHE. The configuration profile provides that the user interface of the remote control workstation may be adapted for performing load handling operations based on a type of LHE. In an example, when the user interface is adapted for performing load handling operations based on a type of LHE, one or more functionalities of a load handling equipment type specific control view may be adapted based on the type of LHE. An example of the configuration profile comprises computer readable file.

It should be appreciated that settings of the configuration profile 124 may be applied to one or more components of the user interface of the remote control workstation for adapting the user interface for performing load handling operations based on a type of LHE. Adapting the user interface may be performed in response to establishing a connection between the remote control workstation and the LHE and/or the in response to activation of the remote control workstation. The remote control workstation may be activated via the user interface, for example via a user selecting a button or user interface element on the user interface of the remote control workstation. When the settings are applied to the components of the user interface, the user interface may be adapted for performing load handling operations based on a type of LHE at least by causing to display the load handling equipment type specific control view. Accordingly, the load handling equipment type specific control view may provide that the user interface is adapted for controlling load handling operations according to the type of the LHE. The settings may be applied in one or more or all or components of the user interface such that sufficient adaptation for the specific type of LHE may be achieved for performing load handling operations by the user interface of the remote control workstation. The components may be configured to have one or more functionalities in accordance to the type of the LHE for performing load handling operations based on the type of LHE.

In an example of adapting the user interface by the configuration profile 124 for performing load handling operations based on a type of LHE, settings of the configuration profile applied to a display 110 of the use interface may cause that a load handling equipment type specific control view is displayed by the display 110. The load handling equipment type specific control view provides that the user interface is adapted for controlling load handling operations according to the type of the LHE. The load handling equipment type specific control view may comprise one or more user interface elements, i.e. control elements, for controlling of the specific type of LHE. The user interface elements may be selectable to the user by means for obtaining input from the user provided by one or more components of the user interface. The remote control workstation and the LHE may be connected over a communications network 120. The communications network may be capable of communications of various data between the remote control workstation and the LHE. In this way the remote control workstation provides operating LHE remotely without a line-of-sight between a user positioned at the remote control workstation and the operated LHE.

The communications network 120 may comprise a single communications network or interconnected communications networks which may be implemented by wireless or wired networking technologies. Communications over the communications network may be conducted at least using the Internet protocol suite. However, also other protocols may be used. A connection between the remote control workstation and the LHE may be considered to have been established when data may be successfully communicated between the LHE and the remote control workstation.

The remote control workstation 102 may be a computerized system comprising a processor or a processor core connected to a memory, for example a non-transitory computer readable medium, serving for a computer 122. The processor or a processor core may be configured to execute a computer readable code or instructions stored to the memory to cause a method in accordance with an embodiment may be performed.

An embodiment concerns a computer program for use in a remote control workstation 102 for controlling more than one type of load handling equipment (LHE) 104, 106, 108, which when executed on a computer 122 comprised in the remote control workstation, causes a method in accordance with an embodiment to be performed.

It should be appreciated that parts of the remote control workstation may connected at least for communications of data, a control view, load handling equipment type specific control view, load handling equipment fleet management view, a menu, a joystick menu, a user interface element and configuration profile. Suitable connections comprise wireless and wired data transmission technologies for example a computer bus.

Figure 2:
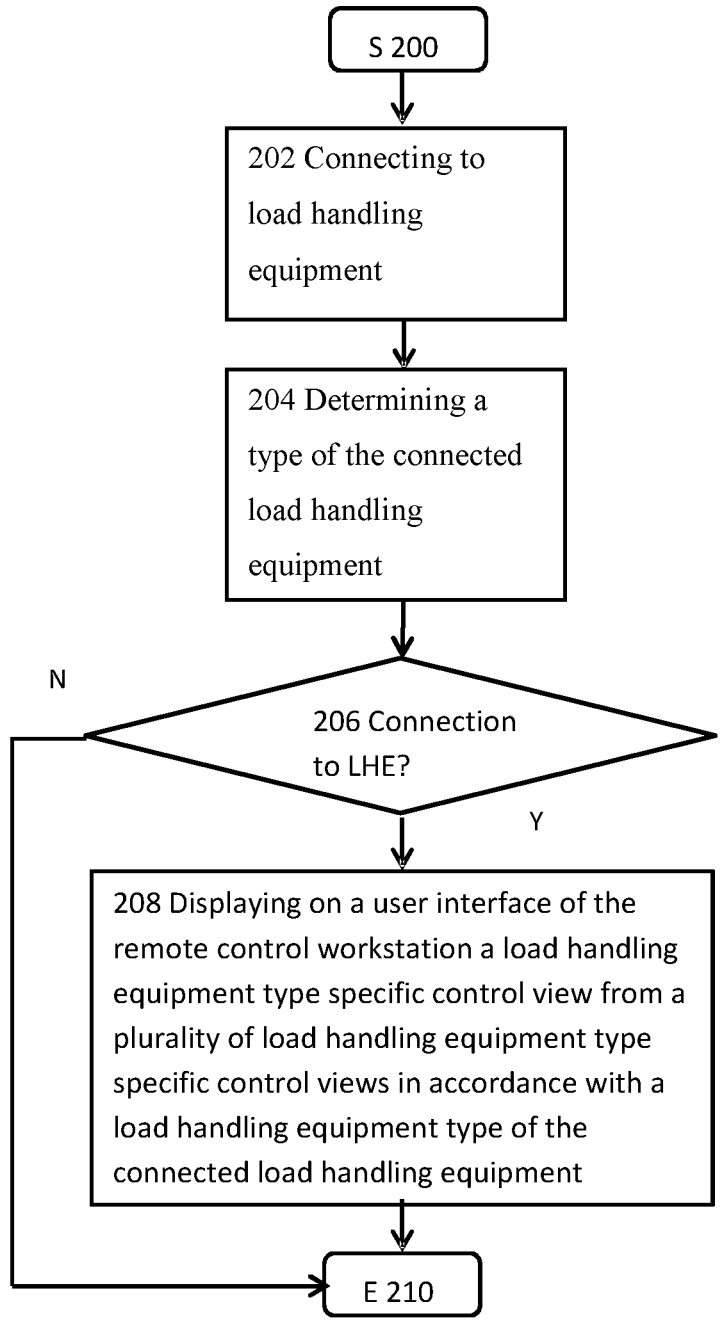
FIG. 2 illustrates a method for a remote control workstation in accordance with at least some embodiments of the present invention.

FIG. 2 illustrates a method for a remote control workstation in accordance with at least some embodiments of the present invention. The method may be performed by the remote control workstation described with FIG. 1. The method may start 200, when there is a need to perform load handling by an LHE remotely using the remote control workstation. The LHE may be a type of LHE from a plurality of types of LHE the remote control workstation has been configured to communicate with. The need for performing load handling may be caused by a scheduled task for load handling that the LHE has been assigned. In another example a user may want to perform an unscheduled load handling task using the LHE.

Phase 202 may comprise connecting to the LHE. Phase 204 may comprise determining a type of the connected load handling equipment. Phase 208 may comprise displaying on a user interface of the remote control workstation a load handling equipment type specific control view from a plurality of load handling equipment type specific control views in accordance with a load handling equipment type of the connected load handling equipment. Phase 206 may comprise checking whether a connection between the remote control workstation and said load handling equipment has been established. Phase 208 may be performed in response to establishing the connection between the remote control workstation and said load handling equipment. When the workstation is connected to the LHE and the LHE type specific control view is displayed, the remote control workstation may be used by the user to control at least part of the load handling operations by the connected LHE. Accordingly, the load handling equipment type specific control view provides that the user interface is adapted for controlling load handling operations according to the type of the LHE. After the load handling by the LHE is completed the method may continue to end 210, where the load handling of the connected LHE is not controlled and the LHE may be disconnected. It should be appreciated that if a connection between the workstation and the LHE has not been established, the method may continue to end 210. Since the load handling equipment type specific control view according to the type of the LHE is displayed, the remote control workstation is capable to be used for controlling at least part of the load handling operations of different types of LHE.

In an embodiment, phase 208 may be performed in response to activation of the remote control workstation. The remote control workstation may be activated after the remote control workstation is connected to the LHE in phase 202. Phase 206 may comprise checking whether the remote control workstation is activated and if the remote control workstation is activated the phase 208 may be performed. On the other hand if the remote control workstation is not activated the method may proceed to end 210.

The remote control workstation may be activated via the user interface, for example via a user selecting a button or user interface element on the user interface of the remote control workstation. When the remote control workstation is activated, the user interface of the remote control workstation may be adapted to the type of the LHE and the remote control workstation may be used to control load handling operations based on the type of the LHE. Accordingly, when the remote control workstation is activated, capability of the remote control workstation to control load handling operations of the LHE may be increased with respect to a situation, where the remote control workstation is inactive. On the other hand, when the remote control workstation is inactive, the control over the load handling operations of the LHE may be limited with respect to the remote control workstation being active. The capability of the remote control workstation may be measured for example in terms of a number of functionalities for controlling the load handling operations of the LHE.

In an example, when the remote control workstation is active, the remote control workstation may be capable of controlling essentially all load handling operations of the LHE, but at least capable of controlling one or more of an emergency stop, a trolley, a spreader, flippers and lighting systems of the LHE. The controlling of the load handling operations may provide that settings of the trolley, spreader, flippers and lighting systems may be adjusted. Controlling the emergency stop may provide that the load handling operations of the LHE may be stopped.

In an example, when the remote control workstation is inactive, the remote control workstation may be capable of controlling the LHE to an emergency stop for stopping the load handling operations of the LHE.

It should be appreciated that, when the connection to the LHE has been established in phase 202, for example the remote control workstation is inactive or has been activated, various data may be communicated between the remote control workstation and the LHE. In an example, the data may comprise one or more video streams that may be received from the LHE at the remote control workstation. The video streams may comprise video from the LHE such that operations of the LHE may be monitored.

In an example, phase 202 may comprise connecting to the LHE 204 defined in a configured list of LHE. The list may comprise a plurality of LHE and connection settings for each of the LHEs. The list may be a computer readable file stored to a memory of the remote control workstation. The remote control workstation may apply the connection setting for connecting to the LHEs. In an example, the connection settings may define settings for a data connection between the remote control workstation and the LHEs over a communications network such as the internet. The list may further comprise information indicating a type of each of the LHEs for determining the type of the LHE in phase 204.

In an example, phase 204 may comprise applying settings to the remote control workstation in accordance to the determined type of the LHE after the connection has been established to the LHE. In this way the user interface or one or more components of the user interface may be adapted to the specific type of LHE to cause displaying the load handling equipment type specific control view. The settings may be stored in a configuration profile of the remote control workstation.

It should be appreciated that after the method has proceeded to end 210, the method may be performed again and the remote control workstation may be connected to the same LHE as previously or to another LHE. If the another LHE is a different type, then the remote control workstation is adapted to the different type of LHE and a load handling equipment type specific control view in accordance with the type of the another LHE is displayed in phase 208.

It should be appreciated that more than one remote control workstation may be connected to a plurality of LHE, whereby each of the connected workstations may be performing the phases of method of FIG. 2 in parallel. Then, establishing a connection between at least one of the remote control workstations and at least one of the load handling equipment is sufficient to cause phase 208 to be performed. Once the LHE type specific control view is displayed in one remote control workstation the load handling by the specific LHE may be performed by that remote control workstation. The one or more other remote control workstations may continue the method of FIG. 2, for example and connect to other LHE, after the connection between the at least one of the remote control workstations and the at least one of the load handling equipment has been established.

In an embodiment phase 208 comprises that the load handling equipment type specific control view is selected from the plurality of load handling equipment type specific control views based on the type of the connected LHE and data obtained from the connected LHE is used to populate the load handling equipment type specific control view. In this way the load handling equipment type specific control view may be made LHE specific.

In an example, the data obtained from the connected LHE may comprise speed of the LHE, a trolley setting, a spreader setting, a flippers setting and lighting system setting. The speed of the LHE may be a horizontal speed of the LHE and/or a hoisting speed of the LHE. The flippers setting may be flippers up or flippers down. The spreader setting may be a length of the spreader. The lighting system setting may be a configuration of the lighting system for defining which lights are on and which light are off in the LHE.

Figure 3:
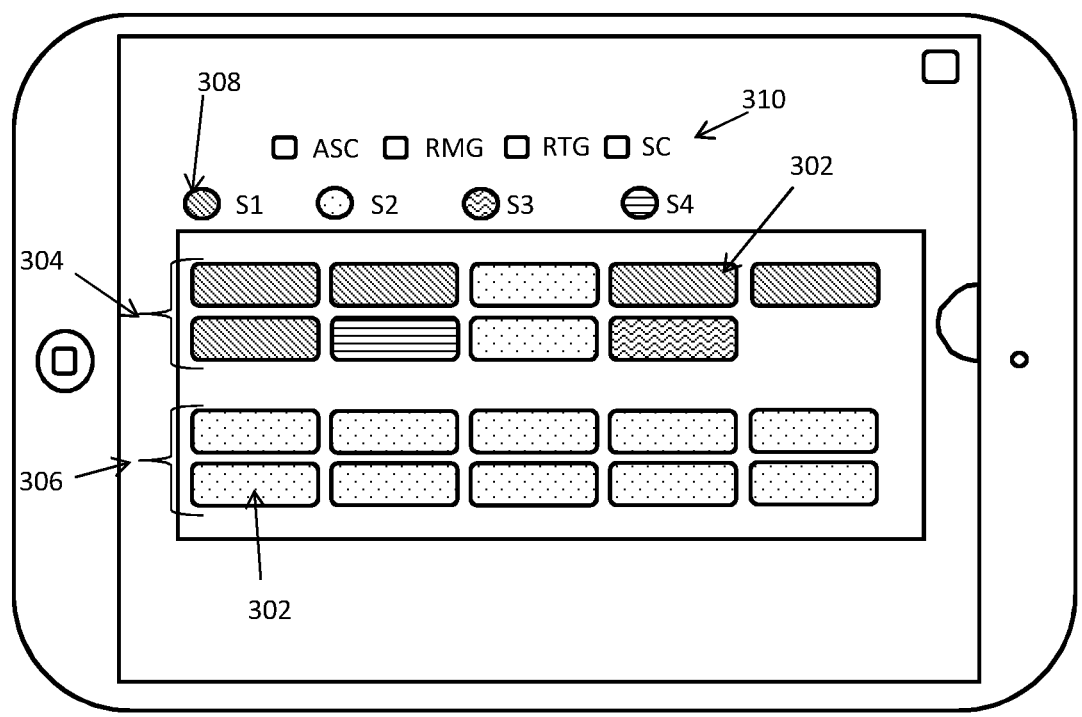
FIG. 3 illustrates a load handling equipment fleet management view in accordance with at least some embodiments of the present invention.

FIG. 3 illustrates a load handling equipment fleet management view in accordance with at least some embodiments of the present invention. The load handling equipment fleet management view may be displayed on a user interface of the remote control workstation described with FIG. 1, for example on the touch screen 118 or the display 110. The fleet management view may be displayed before a connection has been established to a specific LHE. Accordingly, the fleet management view may be displayed at start 200 of the method of FIG. 2. In response to a selection of a load handling equipment by a user via the fleet management view, the selected load handling equipment may be connected and the load handling equipment type specific control view may be displayed in accordance with phases 202 to 208 in FIG. 2. Displaying the load handling type specific control view may require activating the remote control workstation for controlling at least a part of the load handling operations of the LHE connected to the remote control workstation.

The fleet management view may comprise user selectable user interface elements 302 corresponding to LHE configured to the remote control workstation. The user selectable user interface elements may be grouped according to types of the LHE such that a given user interface element is closer to one or more other user interface elements of the same type than one or more user interface elements of another type. This facilitates the user to obtain information of a given type of LHE. In the illustration of FIG. 3 the LHE are grouped into two groups 304, 306, however, it should be appreciated that the embodiments described herein apply to more than two groups for example three, four, five six, seven or a higher number of groups.

The fleet management view may comprise one or more status indicators S1, S2, S3, S4 308 for indicating status of LHE. The status indicators may indicate for example whether the LHE is operating autonomously or manually. Further the status indicators may indicate whether there is an alarm at the LHE or the LHE is out of operation. In the illustration of FIG. 2, different statuses of the LHE are indicated by the user interface elements and the status indicators having a common pattern. Accordingly, a status of LHE may be determined to be a status indicated by the status indicator having the same or similar pattern with the user interface element corresponding to the LHE. It should be appreciated that additionally or alternatively also a color of the user interface element and a status indicator may be used to indicate a status of LHE.

The fleet management view may comprise one or more user interface elements for filtering, i.e. filters 310, LHE that are displayed on the fleet management view. The LHE may be filtered based on types of the LHE. When one or more filters are selected by the user, user interface elements 302 corresponding to types of the selected filters may be displayed on the fleet management view. When the user interface elements are grouped according to their types, the groups 304, 306 corresponding to the selected filters may be displayed.

Figure 4:
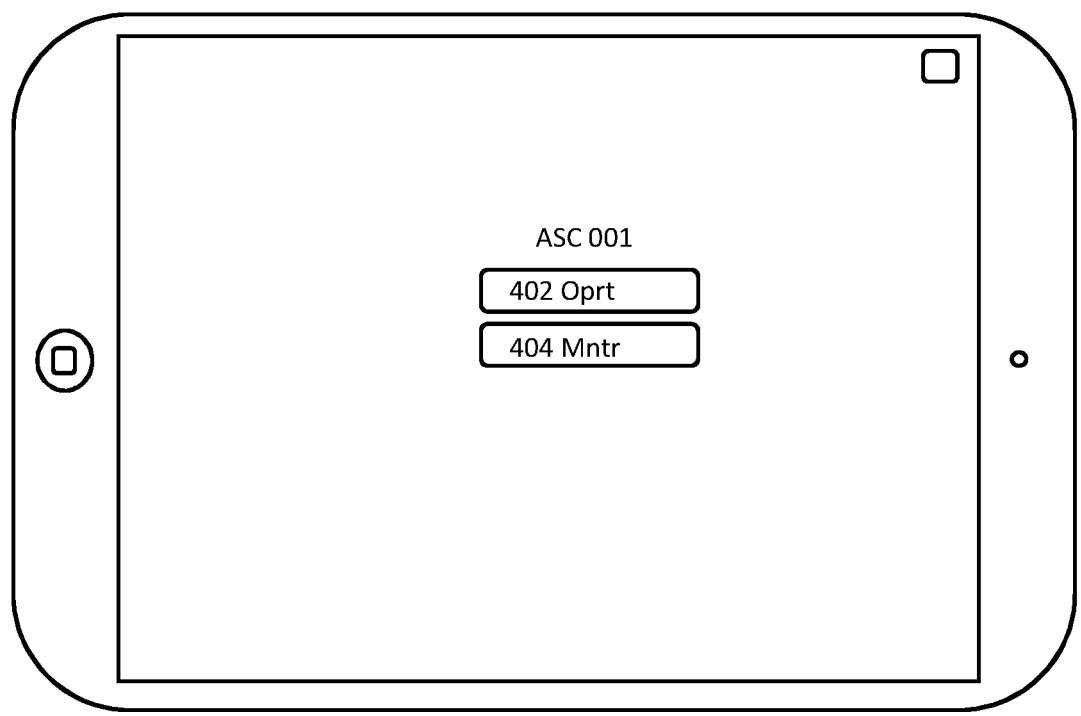
FIG. 4 illustrates a user interface for selecting a remote control workstation mode in accordance with at least some embodiments of the present invention.

FIG. 4 illustrates a user interface for selecting a remote control workstation mode in accordance with at least some embodiments of the present invention. The user interface for selecting a remote control workstation mode, i.e. a mode selection view, may be displayed for example on the touch screen 118 or the display 110 of the remote control workstation in FIG. 1. It should be appreciated that the user interface illustrated in FIG. 4 may be combined with the user interface of FIG. 3, whereby user interface elements of the FIGS. 3 and 4 may be displayed by in a single user interface.

In an embodiment, the remote control workstation may have at least two modes of a monitoring mode, where functionalities of the load handling equipment type specific control view are limited, and an operation mode comprising more functionalities than the monitoring mode. The modes may be selected by the user via the user interface comprising user interface elements 402, 404 corresponding to each of the modes.

In an embodiment, the load handling equipment is connected in response to selection of the operation mode by the user via the user interface. In this way the displaying a load handling equipment type specific control view may be controlled according to the operation mode after the connection is established. In an example, the user may be displayed the user interface comprising user interface elements 402, 404 corresponding to each of the modes before phase 202 in FIG. 2.

In an embodiment, the load handling equipment type specific control view is displayed in response to connecting the load handling equipment. Displaying the load handling type specific control view may require activating the remote control workstation for controlling at least a part of the load handling operations of the LHE connected to the remote control workstation, in accordance with phases 202 to 208 in FIG. 2.

In an embodiment, a configuration profile of the remote control workstation comprises settings corresponding to different types of LHE. When the settings are applied to one or more components of the user interface, the user interface may be adapted for performing load handling operations based on a type of LHE.

In an embodiment, the components may be adapted by settings corresponding to the specific type of LHE. The setting may be stored in a configuration profile 124 comprising settings corresponding to different types of LHE. The configuration profile may be stored to a memory, where the configuration profile may be accessible for applying the settings to the user interface. Adapting the components provides that input from the user may be obtained by the adapted components and/or information to the user may be output by the adapted components. Examples of the components for obtaining input from the user comprise a button 114, a key, a keypad, a joystick 116, a microphone, a touch screen 118 and other means for obtaining input from the user. Examples of the components for outputting information to the user comprise display devices for computers, touch screens, means for tactile output, means for vibrations and means for audible output.

For example, a joystick 116 may be configured to be controllable by the user to cause a trolley to rotate, when settings of the ASC are applied to the remote control workstation and the user moves his/her hand in a manner that is interpreted based on the settings of the ASC as a trolley rotation. Then, when settings of SC are applied to the remote control workstation, and the user moves his/her hand in the same way as previously when the configuration profile of the ASC was applied to the remote control workstation, the movement of the user's hand is interpreted based on the settings of the SC as steering the SC. Accordingly, settings of the configuration profile applied to the user interface components may change functionality of the components of the user interface. Although the above example is given using ASC and SC, it should be appreciated that also other types of LHE may have corresponding settings in the configuration profile and functionalities of the user interface components may change, when different settings are applied to the user interface components. Although the above example is given using the joystick as example of user interface component, it should be appreciated that also other user interface components may be adapted based on the settings such that input of the user received by a component may be adapted to the specific type of LHE.

Figure 5:
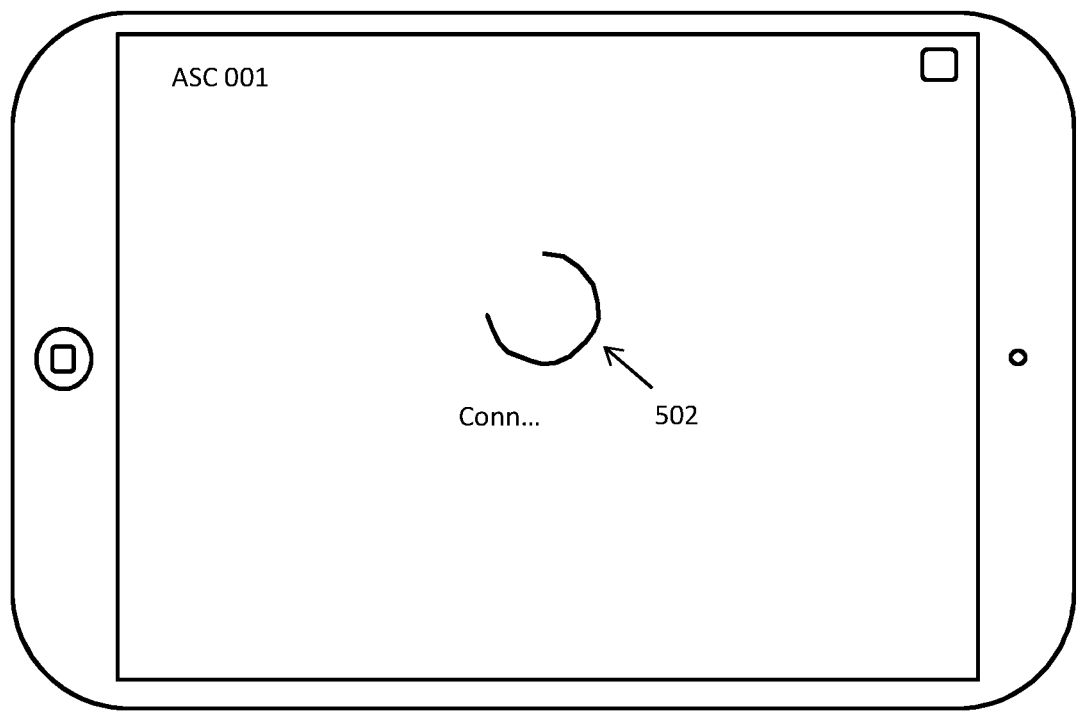
FIG. 5 illustrates a user interface, when connecting to a load handling equipment in accordance with at least some embodiments of the present invention.

FIG. 5 illustrates a user interface, when connecting to a load handling equipment in accordance with at least some embodiments of the present invention. The user interface may be the user interface of the remote control workstation described with FIG. 1. The user interface may be displayed for example in response to selection of a mode by the user via the user interface according to FIG. 4 or in connection with phase 202 in FIG. 2. The user interface may comprise a graphical indicator 502 for indicating that a connection is being established to the load handling equipment.

Figure 6:
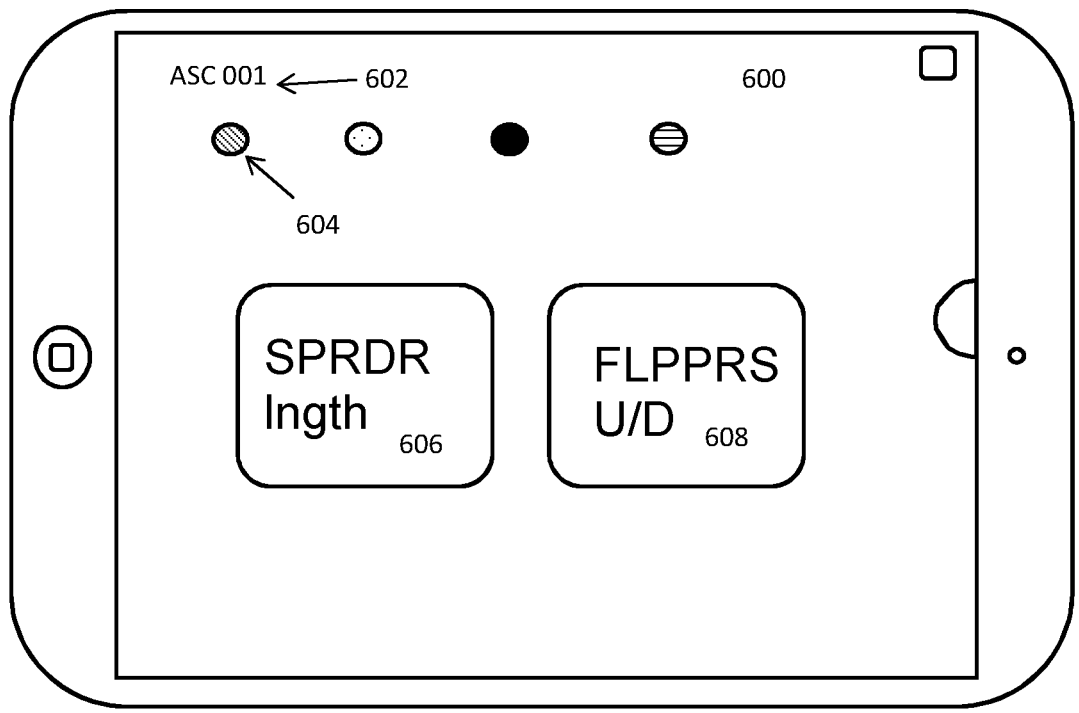
FIG. 6 illustrates a user interface, when a remote control workstation is in an operation mode in accordance with at least some embodiments of the present invention.

FIG. 6 illustrates a user interface, when a remote control workstation is in an operation mode in accordance with at least some embodiments of the present invention. The user interface may comprise a load handling equipment type specific control view 600 for controlling at least a part of load handling operations of the LHE. The user interface may be the user interface of the remote control workstation described with FIG. 1. The load handling equipment type specific control view may be displayed in response to a user activating an operation mode via the user interface, for example via the user selecting a button or user interface element on the remote control workstation, for example via the user interface illustrated in FIG. 4. The selection of the operation mode may cause establishing a connection between the remote control workstation and LHE and displaying the load handling equipment type specific control view in accordance with phases 206 and 208 of FIG. 2.

The load handling equipment type specific control view may comprise load handling equipment specific information, for example load handling equipment name 602 and load handling equipment status 604. In this way the user may identify the load handling equipment and associate the load handling equipment specific information, e.g. the status and possible other LHE information on the load handling equipment type specific control view, to the LHE.

The load handling equipment type specific control view may comprise one or more user interface elements, i.e. control elements, 606, 608 for controlling of the specific type of LHE. The user interface elements may comprise elements corresponding to physical structures of the LHE, for example trolley, a spreader, flippers and lighting systems. However, load handling equipment type specific control view is adapted to display only user interface elements that are applicable for the specific type of LHE. For example, for an ASC the user interface elements may comprise elements for controlling trolley and spreader but for an SC, the user interface elements may comprise an element for controlling a spreader but not an element for controlling a trolley, since there is no trolley in the SC.

In an example the control elements may comprise one or more of an element 606 for adjusting spreader length and an element 608 controlling flippers. A selection of the element may cause that a menu is displayed for selecting a setting corresponding by a menu item or the selection may cause an automatic switch to another setting. In an example, a selection of the element 606 for adjusting spreader length may cause displaying a menu including menu items corresponding to a plurality of settings for the spreader length. Selection of one of the menu items by the user may cause that the spreader length is adjusted according to the setting corresponding to the selected menu item. In another example, a selection of the element 606 by the user may cause an automatic spreader adjustment. The automatic adjustment may be made to a higher or lower value of the spreader length from a current value of the spreader length. The spreader lengths may be pre-defined for example a pre-defined list. When at the highest or lowest value of the spreader length the selection of the element may cause that the spreader length is adjusted to the closest spreader length value. In a similar manner, a selection of the element 608 for controlling flippers may cause displaying a menu including menu items corresponding to a plurality of settings of the flippers. Selection of one of the menu items by the user may cause that the flippers are adjusted according to the setting corresponding to the selected menu item. In another example, a selection of the element 608 by the user may cause an automatic flipper control. The flippers may be controlled to be moved to one of two positions by the element 608. The flipper positions may comprise e.g. an up position or a down position. Accordingly, an automatic control between two positions may comprise that in response to the user selecting the element 608, a current position of the flippers is switched to the other. It should be appreciated that the above properties of control elements 606 and 608 for controlling the spreader and flippers may be applied also to other control elements for controlling the LHE.

Figure 7:
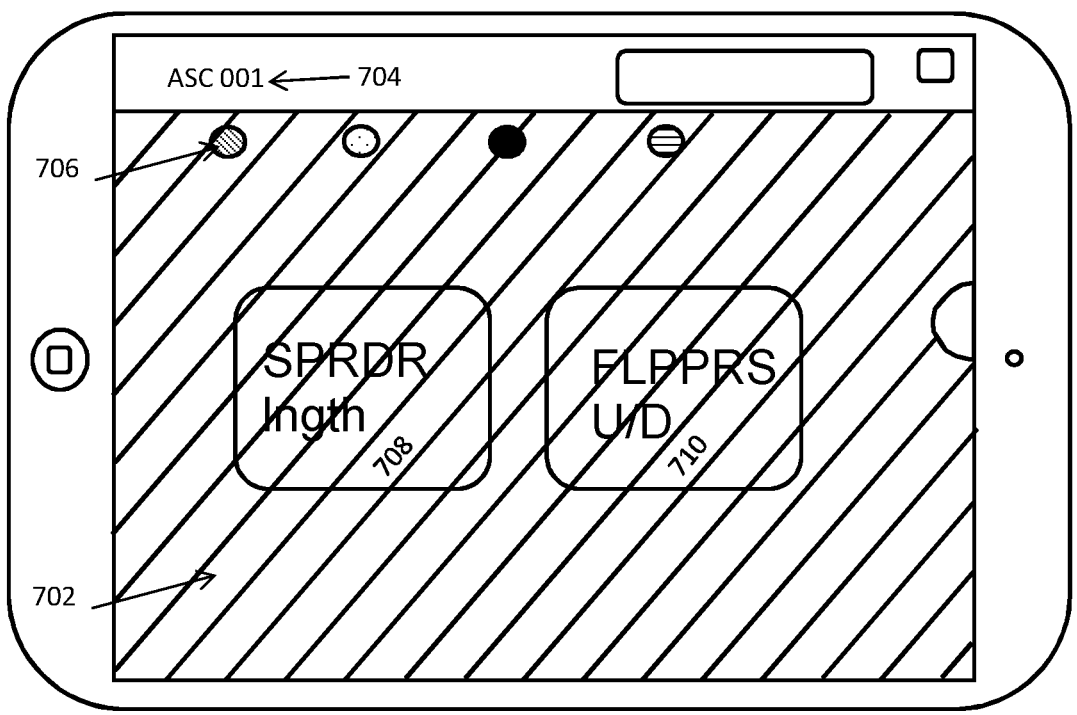
FIG. 7 illustrates a user interface, when a remote control workstation is in a monitoring mode in accordance with at least some embodiments of the present invention.

FIG. 7 illustrates a user interface, when a remote control workstation is in a monitoring mode in accordance with at least some embodiments of the present invention. The user interface may be the user interface of the remote control workstation described with FIG. 1. In the monitoring mode, functionalities of the load handling equipment type specific control view are limited with respect to other modes, for example an operation mode. The functionalities may comprise functionalities for controlling load handling operations of LHE such as functionalities for controlling a trolley, a spreader, flippers and lighting systems. Therefore, the operation mode comprises more functionalities than the monitoring mode. Accordingly, in the monitoring mode, a load handling equipment type specific control view may be displayed such that the view has limited functionalities with respect to displaying the load handling equipment type specific control view in the operation mode. The load handling equipment type specific control view in operation mode may be the load handling equipment type specific control view described with FIG. 6. In FIG. 7, the limited functionalities apply at least on a hatched area 702 of the load handling equipment type specific control view that includes one or more control elements for controlling of the specific type of LHE. The control elements 708, 710 may be in accordance with the control elements, 606, 608 described with FIG. 6.

Accordingly, the limited functionalities may comprise that the load handling equipment type specific control view may be displayed to the user but controlling the LHE may not be enabled or at least controlling the LHE may be limited. For example, the limited functionalities may comprise that selecting one or more control elements 708, 710 displayed on the load handling equipment type specific control view is not possible, when the remote control workstation is in the monitoring mode. Accordingly, selecting control elements displayed on the load handling equipment type specific control view may be disabled, whereby the functionalities of the handling equipment type specific control view are limited.

In the monitoring mode, the user interface may display load handling equipment specific information, for example load handling equipment name 704 and load handling equipment status 706. In this way the user may identify the load handling equipment and associate the load handling equipment specific information, e.g. the status, to the LHE.

Examples of implementing the limited functionalities of the load handling equipment type specific control view comprise that at least a partially transparent layer is arranged on top at least part of the load handling equipment type specific control view. The transparent layer may provide that the load handling equipment type specific control view is viewable underneath the transparent layer on the user interface. The transparent layer is at least partly opaque such that appearance of the load handling equipment type specific control view is modified on the user interface by the transparent layer. Alternatively or additionally, a mask may be added to the load handling equipment type specific control view such that appearance of the load handling equipment type specific control view is modified on the user interface by the mask. The mask and/or transparent layer provide that selecting control elements 708, 710 displayed on the load handling equipment type specific control view may be disabled, while the user may also understand this from the appearance of the appearance of the load handling equipment type specific control view in the monitoring mode. It should be appreciated that load handling equipment specific information may be displayed to the user by the load handling equipment type specific control view as modified by the mask and/or transparent layer, and/or unmodified. For example in FIG. 7 the LHE name is displayed unmodified and the status is displayed modified since being located within the hatched area 702.

In some embodiments, the UI is adapted in response to a preconfigured trigger from the connected LHE. The remote control workstation may be configured to receive state information from the LHE. The trigger may be a preconfigured state of the LHE, detected on the basis of the received state information. Examples of such triggers include one or more of an exception condition or state of the LHE, operation mode of the LHE, current (or next) task or task assignment of the LHE, current position, direction of movement, and/or orientation of the LHE, current operation area of the LHE. In a further example, position of the spreader of the LHE may be monitored and may be an input for controlling adaptation of the UI.

The control view and/or the component configuration may be performed in response to and/or in accordance with the received trigger. In an example, input camera view is controlled on the basis of received position and/or orientation information from the LHE.

Figure 8:
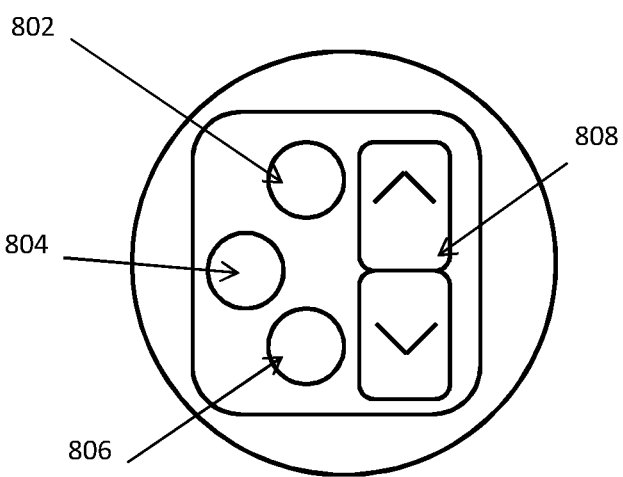
FIG. 8 illustrates a top view of a joystick in accordance with at least some embodiments of the present invention in accordance with at least some embodiments of the present invention.

FIG. 8 illustrates a top view of a joystick in accordance with at least some embodiments of the present invention. The joystick may be in a remote control workstation described with FIG. 1. The joystick may be installed to the remote control workstation such that it extends upwards from the surface from the remote control workstation. The joystick has a top end comprising one or more buttons. The top end of the joystick can be considered a portion of the joystick that is viewable from above, when the joystick is installed to the remote control workstation and held by the user in the user's fist.

The top end of the joystick comprises one or more buttons configured to cause, in response to one or more selections of the buttons by the user, displaying a menu on top of the load handling equipment type specific control view or on a separate device for displaying load handling equipment specific information, browsing the menu and selecting a menu item from the menu. In this way the menu and operations of the menu may be provided without the user releasing his/her grip from the joystick.

In an example the buttons may comprise a menu button 802, a select button, up button 804 and a down button 806. In addition, the joystick may comprise further buttons 808 for controlling the LHE. It should be appreciated that the number of buttons may vary since one or more functionalities may be provided by a single button. Accordingly, a button may have more than one operational mode, where each mode can have different functionalities. The mode of the button may be changed for example in response to selecting the button or any other button of the joystick once, twice, trice, or more times. For example, the menu button and select button may be arranged in the same physical button. First the menu button 802 may serve for displaying a menu on top of the load handling equipment type specific control view. Then, after the menu button is selected by the user, the functionality of the menu button may be changed and the menu button may serve for a select button. The up and down button may serve for moving a selection indicator of a menu item within the menu. Then, when after the up 804 and/or down buttons 806 have been operated such that the selection indicator indicates a menu item the user wants to select, the menu button, serving now for select button, may be selected by the user to select the menu item indicated by the selection indicator. The selection indicator may be any indicator provided within the capabilities of the user interface to highlight a menu item to the user. In an example a change in appearance, e.g. in color, of the menu item may serve for the selection indicator.

FIGS. 9 to 12 illustrate examples of displaying a joystick menu 902 in accordance with at least some embodiments of the present invention. The joystick menu is illustrated on top of a load handling equipment type specific control view but the joystick menu may be displayed also separately, e.g. on a separate display device, from the load handling equipment type specific control view The joystick menu may be displayed in response to the user selecting a menu button, for example in accordance with FIG. 8. The joystick menu may comprise menu items 903 that are selectable to the user via buttons of the joystick for example as described with FIG. 8 above.

Figure 9:
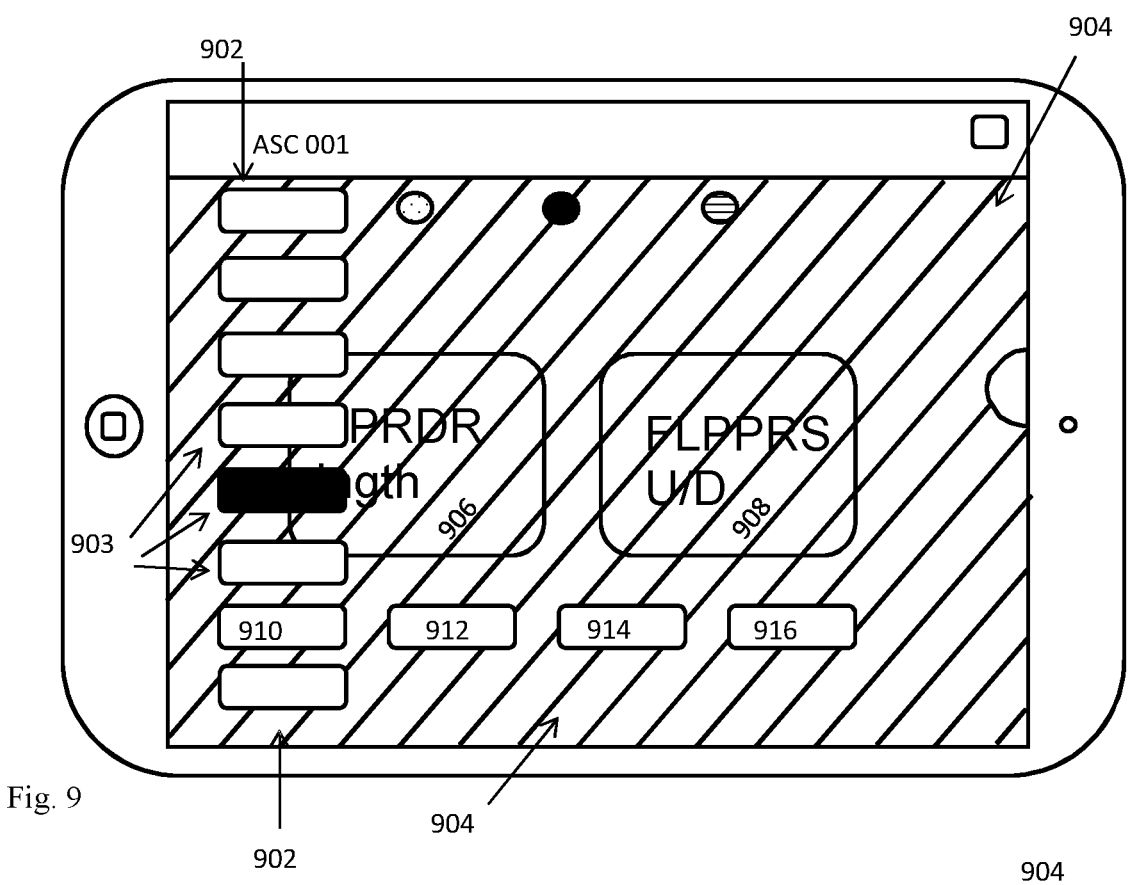
FIGS. 9 through 12 illustrate examples of displaying a joystick menu in accordance with at least some embodiments of the present invention.
Figure 10:
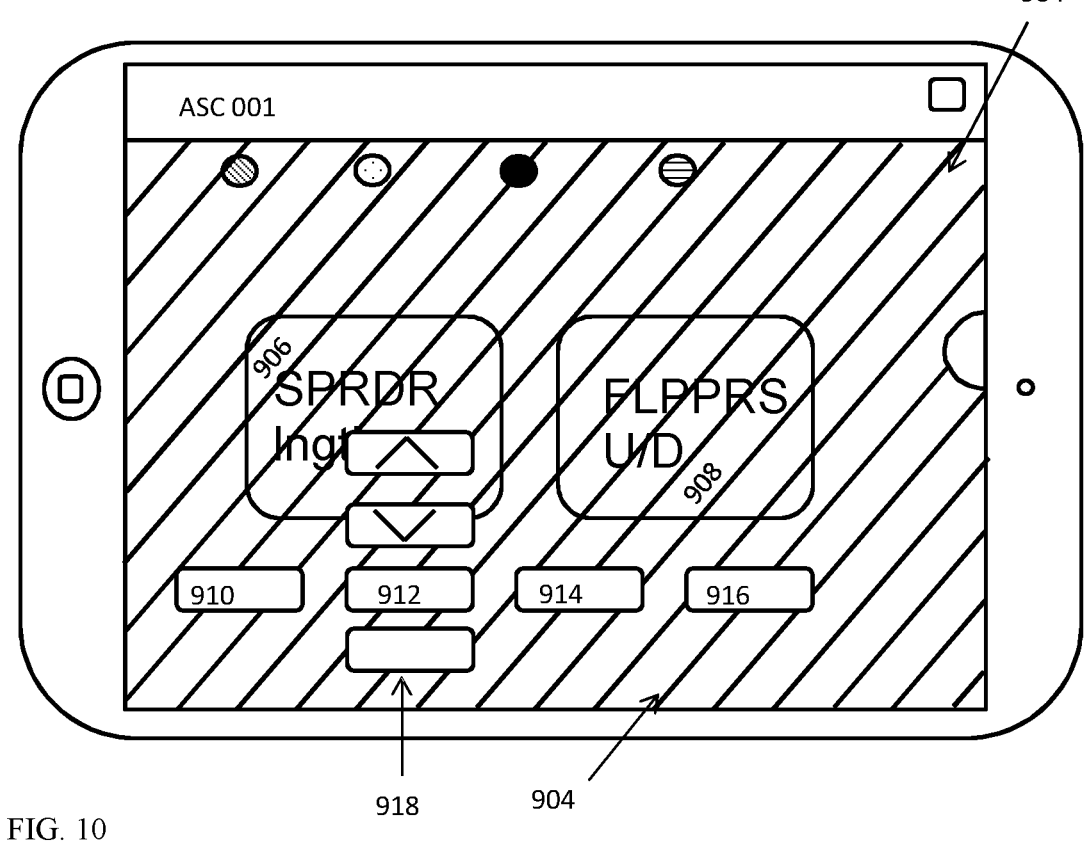
Figure 11:
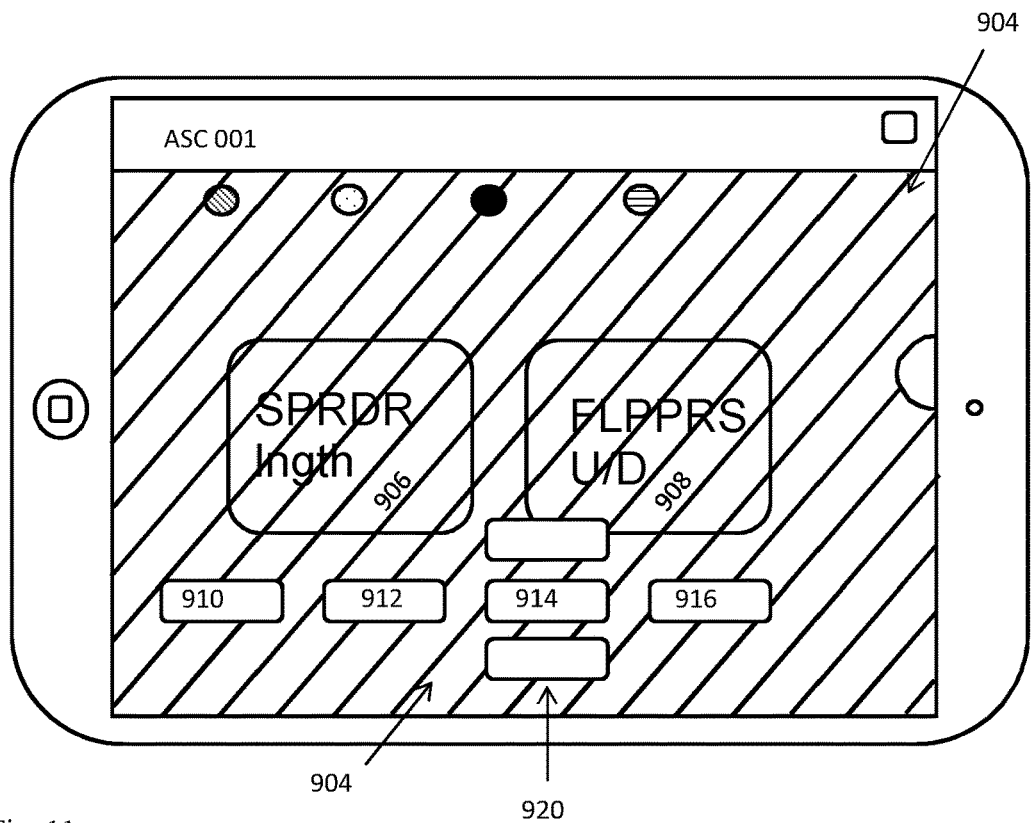
Figure 12:
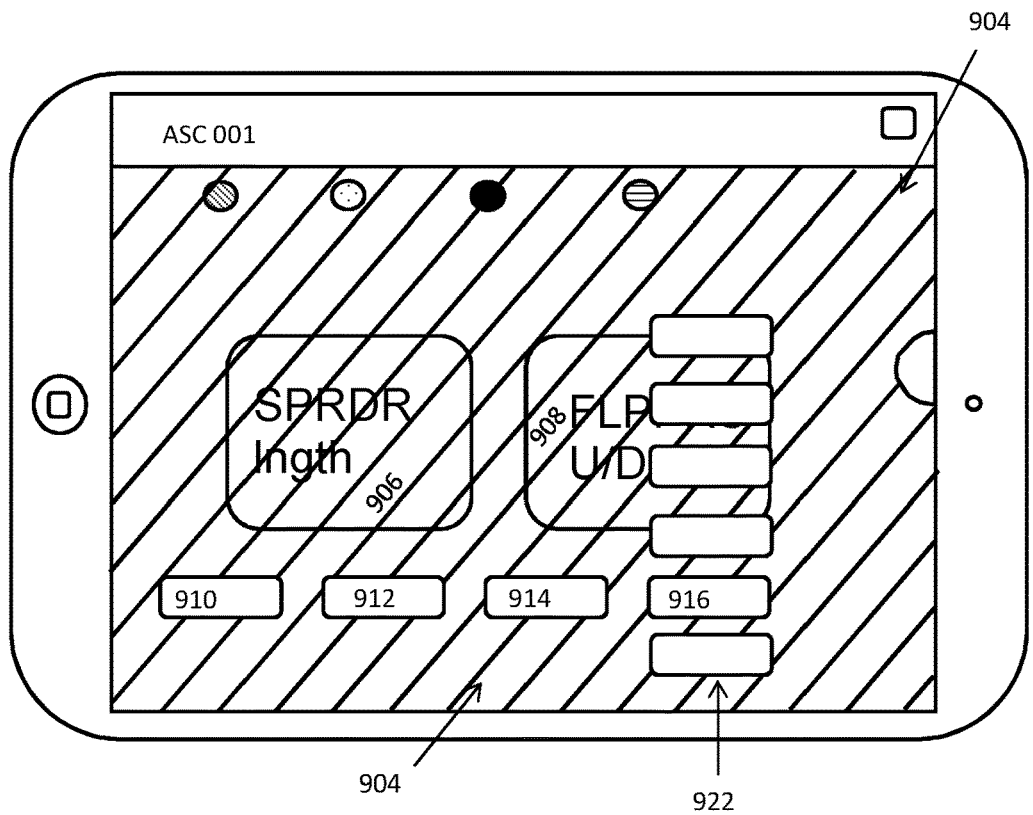

When the joystick menu 902 is displayed, functionalities of a load handling equipment type specific control view may be limited or even unavailable. The functionalities of the load handling equipment type specific control view may be unavailable for example if the load handling type specific control view is not displayed at all or the joystick menu is displayed on the same display device with the load handling equipment type specific control view. In FIGS. 9 to 12, the limited functionalities of the load handling equipment type specific control view are illustrated by a hatched area 904 on top of which the joystick menu is displayed. In FIG. 9, the limited functionalities apply at least on hatched area 904 of the load handling equipment type specific control view that includes one or more control elements 906, 908 for controlling of the specific type of LHE. The control elements may be in accordance with the control elements, 606, 608 described with FIG. 6. The functionalities of the handling equipment type specific control view may be limited in a similar manner as described with FIG. 7.

In an embodiment, the joystick menu 902 is a load handling equipment type specific menu. In this way menu items of the joystick menu may be adapted according to the specific load handling type. It should be appreciated that, when the joystick menu is opened by operating a menu button of the joystick, the type of the LHE of the joystick menu is the same as the type of the LHE of the load handling equipment type specific control view. In this way a high adaptation of the remote control workstation to the specific LHE may be provided.

It should be appreciate that the menu may comprise sub-menus 918, 920, 922. Accordingly, when the joystick menu 902 is displayed in response to the user selecting the menu button, menu items 903 of one of the sub-menus may be displayed. The sub-menu that is first displayed may be regarded as a main menu. The menu items 903 may be browsed by the user using the buttons of the joystick described above with FIG. 8. The sub-menu may be changed to another sub-menu in response to the user selecting the menu button, when a menu item 910, 912, 914, 916 corresponding to the sub-menu is selected. Preferably, when the joystick menu is displayed in response to the user selecting the menu button, a selection indicator is positioned at the menu item corresponding to the current sub-menu, whereby a selection of the menu button of the joystick causes a change of the sub-menu to a next sub-menu. The order the sub-menus are browsed by selections of the menu button may be for example from left to right which is also illustrated by the sequence of sub-menus illustrated in FIGS. 9 to 12. The selection indicator is illustrated in FIG. 9 by an all-black menu item 903.

It should be appreciated that each sub-menu may correspond to a control element for controlling a part of the specific type of LHE. In an example, the sub-menus 918, 920, 922 may comprise a spreader sub-menu, flippers sub-menu, spreader reset sub-menu, a trolley sub-menu and a lighting control sub-menu. A configuration of sub-menus in the joystick menu is specific to the type of load handling equipment. The spreader sub-menu may comprise menu items corresponding to spreader lengths for adjusting the length of the spreader. The flippers sub-menu may comprise menu items corresponding to flipper positions, for example up and down positions, for adjusting the position of the flippers. The spreader reset sub-menu may comprise menu items corresponding to resetting spreader positioning. The trolley presets-menu may comprise menu items corresponding to preset trolley positions for adjusting angle of the trolley. The lighting control sub-menu may comprise menu items corresponding to preset lighting configurations for adjusting which lights are on and which light are off in the LHE.

In an embodiment there is provided a remote control workstation for controlling more than one type of load handling equipment (LHE), comprising: means for communicating with a plurality of types of load handling equipment; means for connecting to one of said load handling equipment; means for determining a type of the connected load handling equipment; and means for, in response to establishing a connection between the remote control workstation and said load handling equipment, displaying on a user interface of the remote control workstation a load handling equipment type specific control view from a plurality of load handling equipment type specific control views in accordance with a load handling equipment type of said load handling equipment.

Examples of the means comprise at least one processor; and at least one memory including computer program code, the at least one memory and computer program code configured to, with the at least one processor, cause the performance of the remote control workstation.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, functionalities, user interfaces, user interface elements, a load handling equipment fleet management view, a load handling equipment type specific control view or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", i.e. a singular form, throughout this document does not exclude a plurality.

ACRONYMS LIST

AGV Automated Guided Vehicle
ASC Automated Stacking Crane
LHE load handling equipment
RMG Rail-Mounted Gantry Crane
RTG Rubber Tired Gantry Crane
SC Straddle Carrier

REFERENCE SIGNS LIST 102 remote control workstation
104, 106, 108 load handling equipment
110 display
112 user
114 button
116 joystick
118 touch screen
120 communications network
122 computer
124 configuration profile
200-210 phases of FIG. 2
302 user selectable user interface elements
304, 306 groups of LHE
308 status indicator
310 filters
402, 404 user interface elements corresponding to remote control workstation modes
502 graphical indicator
600 load handling equipment type specific control view
602 load handling equipment name
604 load handling equipment status
606, 608 control elements
702 hatched area of limited functionalities
704 load handling equipment name
706 load handling equipment status
708, 710 control elements
802 menu button
804 up button
806 down button
808 button for controlling LHE
902 joystick menu
903 menu items
904 hatched area
906, 908 control elements
910 to 916 menu items corresponding to sub-menus
918 to 922 sub-menus

The invention claimed is:

1. A remote control workstation for controlling more than one type of load handling equipment, comprising at least one processor, and at least one memory including computer program code, the at least one memory and computer program code configured to, with the at least one processor, to cause the remote control workstation for communications with a plurality of types of load handling equipment, the load handling equipment comprises container handling equipment comprising a spreader for engaging to a container, and for:

connecting to one of said load handling equipment;
determining a type of the connected load handling equipment; and
in response to establishing a connection between the remote control workstation and said load handling equipment, displaying on a user interface of the remote control workstation a load handling equipment type specific control view from a plurality of load handling equipment type specific control views in accordance with a load handling equipment type of said load handling equipment, wherein the user interface is adapted for performing load handling operations based on the type of the load handling equipment on the basis of settings corresponding to different types of load handling equipment, one or more components of the user interface being configured in accordance with the determined type of the load handling equipment,
data obtained from the connected load handling equipment is used to populate the load handling equipment type specific control view selected from the plurality of load handling equipment type specific control views, and
the load handling equipment type specific control view comprises at least one control element applied for controlling load handling equipment according to the type of the connected load handling equipment, the at least one control element comprising an element for controlling the spreader.

2. The remote control workstation according to claim 1, wherein the load handling equipment type specific control view is displayed in response to activation of the remote control workstation, the remote control workstation after the activation being capable of controlling more load handling operations than when the workstation is inactive, and the inactive remote control workstation is capable of controlling the load handling equipment at least to an emergency stop.

3. The remote control workstation according to claim 1, wherein the user interface is caused to display a load handling equipment fleet management view, and to connect to the load handling equipment in response to a selection of the load handling equipment by a user via the fleet management view.

4. The remote control workstation according to claim 1, wherein the remote control workstation has at least two modes of a monitoring mode, where functionalities of the load handling equipment type specific control view are limited by disabling selecting control elements displayed on the load handling equipment type specific control view and load handling equipment name and load handling equipment status are displayed, and an operation mode comprising more functionalities than the monitoring mode.

5. The remote control workstation according to claim 4, wherein the load handling equipment is connected in response to selection of the operation mode by the user via the user interface.

6. The remote control workstation according to claim 1, further comprising a joystick for controlling operations of load handling equipment, wherein a top end of the joystick comprises one or more buttons configured to cause, in response to one or more selections of the one or more buttons by the user, displaying a joystick menu on top of the load handling equipment type specific control view or on a separate device for displaying load handling equipment specific information, browsing the joystick menu and selecting a menu item from the joystick menu.

7. The remote control workstation according to claim 6, wherein the joystick menu is a load handling equipment type specific menu.

8. The remote control workstation according to claim 7, wherein the load handling equipment type specific menu is selected from a plurality of load handling equipment type specific menus based on a type of the load handling equipment of the load handling equipment connected to the workstation.

9. The remote control workstation according to claim 1, wherein the at least one control element comprises one or more of an element (606) for adjusting spreader length and an element 608 controlling flippers of the container handling equipment.

10. The remote control workstation according to claim 1, wherein the adapting the user interface comprises adapting settings of a joystick of the remote control workstation in accordance with the determined type of the connected load handling equipment.

11. The remote control workstation according to claim 1, wherein the remote control workstation is configured to receive state information from the connected load handling equipment and trigger the user interface adaptation on the basis of the received state information.

12. The remote control workstation according to claim 11, wherein the state information comprises at least one of an exception condition of the load handling equipment, current task or task assignment of the load handling equipment, and position of a spreader of the load handling equipment.

13. A method for a remote control workstation for controlling more than one type of load handling equipment, wherein the remote control workstation is configured to communicate with a plurality of types of load handling equipment, the load handling equipment comprising container handling equipment comprising a spreader for engaging to a container, the method comprising:
connecting to one of said load handling equipment;
determining a type of the connected load handling equipment; and
in response to establishing a connection between the remote control workstation and said load handling equipment, displaying on a user interface of the remote control workstation a load handling equipment type specific control view from a plurality of load handling equipment type specific control views in accordance with a load handling equipment type of said load handling equipment, wherein
the user interface is adapted for performing load handling operations based on the type of the load handling equipment on the basis of settings corresponding to different types of load handling equipment, one or more components of the user interface being configured in accordance with the determined type of the load handling equipment, and
data obtained from the connected load handling equipment is used to populate the load handling equipment type specific control view selected from the plurality of load handling equipment type specific control views, and
the load handling equipment type specific control view comprises at least one control element applied for controlling load handling equipment according to the type of the connected load handling equipment, the at least one control element comprising an element for controlling the spreader.

14. The method according to claim 13, wherein selection of the control element by the user causes an automatic spreader adjustment or automatic flipper control.

15. A non-transitory computer readable medium having stored thereon a set of computer readable instructions for use in a remote control workstation for controlling more than one type of load handling equipment, which when executed on a computer comprised in the remote control workstation, causes a method in accordance with claim 13 to be performed.

16. The remote control workstation according to claim 2, wherein the user interface is caused to display a load handling equipment fleet management view, and to connect to the load handling equipment in response to a selection of the load handling equipment by a user via the fleet management view.

17. The remote control workstation according to any of claim 2, wherein the remote control workstation has at least two modes of a monitoring mode, where functionalities of the load handling equipment type specific control view are limited by disabling selecting control elements displayed on the load handling equipment type specific control view and load handling equipment name and load handling equipment status are displayed, and an operation mode comprising more functionalities than the monitoring mode.

18. The remote control workstation according to claim 2, further comprising a joystick for controlling operations of load handling equipment, wherein a top end of the joystick comprises one or more buttons configured to cause, in response to one or more selections of the one or more buttons by the user, displaying a joystick menu on top of the load handling equipment type specific control view or on a separate device for displaying load handling equipment specific information, browsing the joystick menu and selecting a menu item from the joystick menu.

19. The remote control workstation according to claim 2, wherein the adapting the user interface comprises adapting settings of a joystick of the remote control workstation in accordance with the determined type of the connected load handling equipment.

20. The remote control workstation according to claim 2, wherein the remote control workstation is configured to receive state information from the connected load handling equipment and trigger the user interface adaptation on the basis of the received state information.

* * * * *